Patented Aug. 21, 1923.

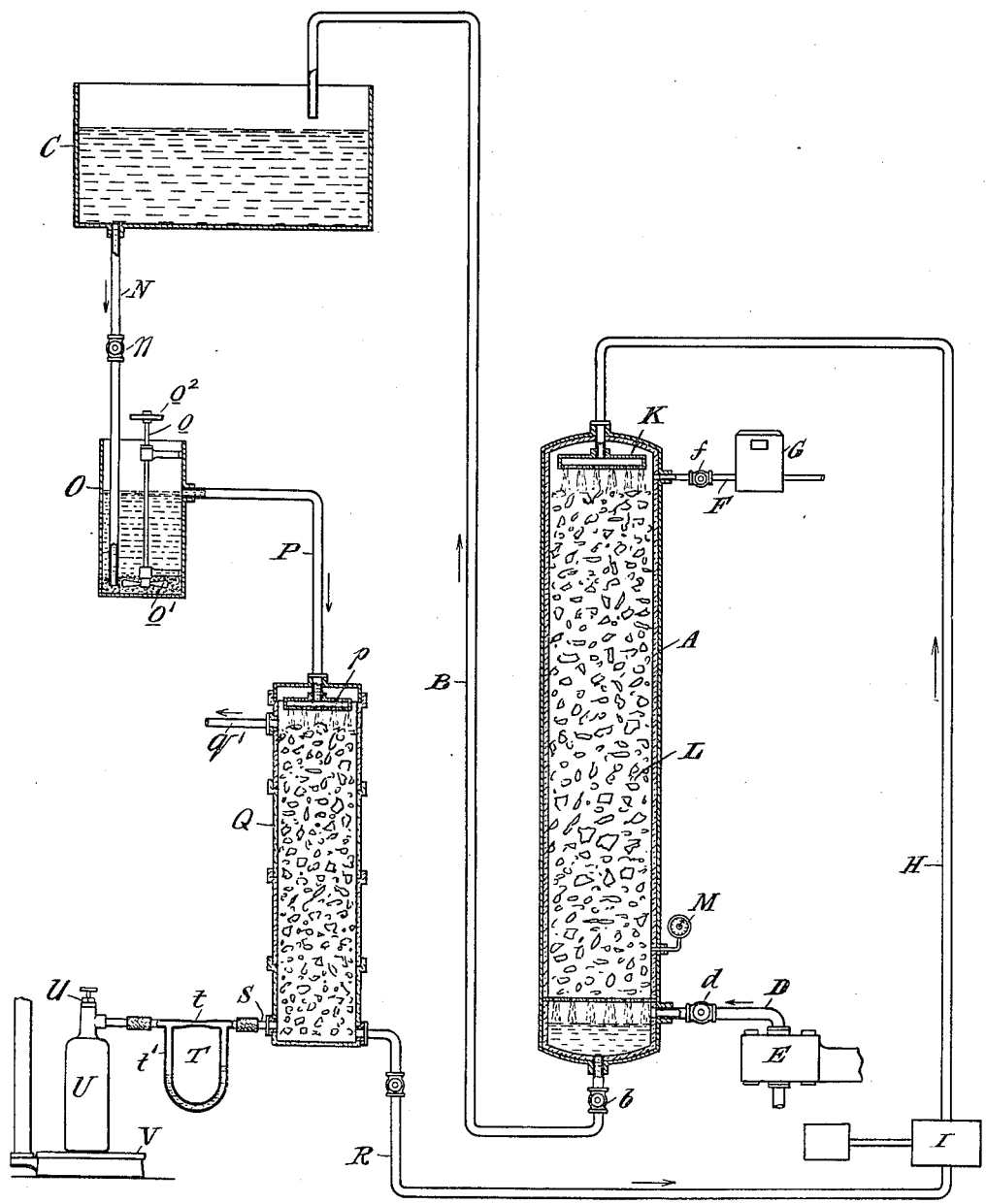

1,465,595

UNITED STATES PATENT OFFICE.

BENJAMIN T. BROOKS, OF BAYSIDE, NEW YORK, ASSIGNOR, BY MESNE ASSIGNMENTS, TO CARBIDE AND CARBON CHEMICALS CORPORATION, A CORPORATION OF NEW YORK.

MANUFACTURE OF CHLORHYDRIN.

Application filed June 20, 1918. Serial No. 240,907.

*To all whom it may concern:*

Be it known that I, BENJAMIN T. BROOKS, a citizen of the United States, residing at Bayside, county of Queens, and State of New York, have invented certain new and useful Improvements in Manufacture of Chlorhydrin, fully described and represented in the following specification and the accompanying drawings, forming a part of the same.

The present invention relates to improvements in the manufacture of chlorhydrins of unsaturated hydrocarbons.

The object of the invention is to provide a process by which such chlorhydrins can be produced rapidly in large quantities more economically than has been possible heretofore and with an apparatus occupying far less space for a corresponding output than has heretofore been possible.

With the above object in view, the invention consists in the features and details which will first be described in connection with the accompanying drawings of an apparatus and then more particularly pointed out.

The drawing is a diagrammatic illustration of an apparatus suitable for carrying out the present invention.

In carrying out the process in the best form, a gas comprising or consisting of an unsaturated hydrocarbon in gaseous state, and particularly a normally gaseous unsaturated hydrocarbon, such, for example, as an olefin gaseous at normal temperature, is supplied continuously to a weak aqueous solution of hypochlorous acid (HOCl), which also is continuously maintained in the zone of reaction. The solution also contains a dissolved salt. The reaction is carried out under a pressure higher than atmospheric at a temperature which should not be too high and which may be considered low relative to the prior practice of making chlorhydrins. The resulting chlorhydrin is retained in the solution at first, and the entire mixture is treated to generate more hypochlorous acid in it, after which it is brought into contact with more gaseous unsaturated hydrocarbon so as to form more chlorhydrin thereof. In this way the proportion of the chlorhydrin in the solution is gradually strengthened. But, as I have discovered, it is not advantageous to allow the proportion of chlorhydrin to become too high, since apparently a maximum of efficiency is reached, after which the increase of strength of the chlorhydrin solution results in disadvantageous counter reactions of the chlorhydrin and other materials.

Referring to the drawings, A is a vessel constituting a reaction chamber arranged to sustain an interior pressure and to be unaffected by the chemicals contained in it. In practice a shell of metal, and preferably steel, is provided, this having an inert lining, such, for example, as cement or lead. This vessel has a liquid discharge outlet connected by a pipe B, preferably lead lined, to a storage tank C, a suitable valve $b$ being provided for controlling the discharge of liquid from the vessel A.

A gas inlet D, is provided near the bottom of the vessel A. This inlet is arranged to deliver gas under pressure to the vessel A, as, for example, from a gas compressor E. The inlet pipe D is controlled by a valve $d$. A gas escape pipe F, connected to the top of the vessel A serves to carry off any gases unacted upon in the chamber. A suitable valve $f$, is provided in this escape pipe F, the valve being of such a construction that it will allow the gradual escape of such excess gas, while still maintaining the desired pressure in the vessel A. The escape pipe F discharges through a gas meter G, so that the amount of gas discharged may be known.

A supply pipe H is arranged to supply a solution containing hypochlorous acid to the vessel. This solution is forced into the vessel A in any suitable way, as, for example, by a pump I, which pumps from a suitable source of supply, as will be explained hereinafter. The pipe H may terminate inside the vessel A in a suitable spraying head, consisting, in the present instance, of a perforated header K. For the purpose of insuring a proper contact of the gas and solution within the vessel A, the latter may be filled with a suitable filling material, as for example, stone-ware filling material indicated at L. The vessel may be provided with a pressure gauge, as indicated at M. The storage tank C has an outlet pipe N arranged to discharge into a mixing chamber O, the pipe N being controlled by a valve $n$. The mixing chamber is provided with suitable means for agitating the materials therein. In the present invention a common mechanical agitator is indicated, this comprising a rotatable shaft $o$, having blades $o'$ at its lower end and a pulley $o^2$ at its upper end by which it may be driven.

The mixing vessel has an overflow discharge pipe P, leading from a point near the upper portion of the vessel to a chlorinating vessel Q, the discharge pipe P terminating inside the vessel Q in a sprayer $p$, of the usual construction. The vessel Q is usually made of stone-ware and may be filled with inert material such as the usual stone-ware filling, as indicated in the drawing.

To the bottom of the chlorinating vessel Q is connected a suction pipe R leading to the pump I. Also means is provided for supplying chlorine gas to the bottom of the vessel Q. In the present example the chlorine is admitted through a chlorine supply pipe S provided with a flow meter T, of usual construction comprising a restricted or Venturi tube $t$, and a U-shaped gauge tube $t'$, containing a suitable liquid. The supply of chlorine may be taken from any suitable source. In the present example, this source is indicated as a tank U containing chlorine under pressure. It is convenient to mount this tank on an ordinary platform scales indicated at V, so that the amount of chlorine in the tank U may be known at any time. The tank has the usual outlet valve $u$, and is connected by a flexible connection such as a rubber tube, to the supply pipe S.

The chlorinating vessel has a suitable opening at its top for the escape of gas, as indicated at $q'$.

The operation of the apparatus in carrying out the process is as follows:

In first starting, a solution of an alkali salt of a weak acid, for example, sodium bicarbonate, is formed in the mixing chamber, as for example, by putting into the chamber the desired amount of sodium bicarbonate, starting the agitator and running in water to cause the formation of a solution containing about 1 to 2% of bicarbonate. This overflows through the pipe P to the chlorinating vessel into which it is sprayed by the sprayer $p$. As soon as the solution begins to enter the chlorinating vessel, chlorine is admitted to the vessel through the chlorine supply pipe S.

The main reaction which takes place is represented by the equation $$NaHCO_3 + H_2O + Cl_2 \rightarrow NaCl + HOCl + H_2CO_3$$

Part of the $CO^2$ of the carbonic acid escapes from the apparatus through the outlet $q'$, while the hypochlorous acid and the sodium chloride remain in the solution. It is very important to use such proportions of the ingredients that the resulting solution will be a weak solution of hypochlorous acid. In practice the best results are obtained when the concentration of HOCl does not quite reach 0.15 per cent. Keeping the strength just under this limit, the yield of chlorhydrin with respect to the chlorine and sodium bicarbonate used is raised to about 85% of the theoretical yield.

The solution of hypochlorous acid is pumped to the top of the reaction vessel A and sprayed into the top of it, flowing downward over the surfaces of the filling material. The gas to be acted upon is admitted near the bottom of the reaction vessel through the pipe D. This gas being under pressure, produces a pressure in the reaction vessel. While the pressure may be varied to a considerable extent, it has been found in practice that a gage pressure between 75 and 90 lbs. per square inch is very suitable.

In manufacturing chlorhydrins of the olefins, the gas employed is usually obtained by cracking petroleum products, and such gas comprises usually some paraffins and about 30 to 50% of olefinic hydrocarbons. These olefins generally consist mostly of ethylene and propylene in about equal proportion, though, of course, the relative proportions vary according to the temperature of cracking. With such a gas the propylene seems to be acted upon first by the hypochlorous acid to form propylene chlorhydrin, ethylene apparently being more resistant. Therefore, where it is desired to form both chlorhydrins in the one reaction vessel, the gas-escape valve $q'$ should be so adjusted that the surplus gas can escape only slowly, thus causing a slow travel of the gas through the apparatus. The gas may be tested from time to time for olefins and the apparatus should be so controlled that only a very small percentage of olefins appears in the escaping gas. In practice it is possible to keep this at about 1 to 2%. In this way both the ethylene and the propylene are acted upon by the hypochlorous acid to form the corresponding chlorhydrins, which are dissolved in the liquid flowing downward through the reaction chamber and accumulate at the bottom of the reaction vessel below the diaphragm therein. From time to time this solution is discharged from the vessel to the storage tank by opening the valve $b$. The valve is then closed and the operation proceeds as before. Or the solution may be permitted to discharge continuously from the tower A by suitable regulation of the valve $b$.

When only propylene is to be acted upon, the scrape-valve $q'$ is opened wider and the gas mixture is fed more rapidly to the reaction vessel, the rate of feed and escape being so regulated that the escaping gas, though containing practically all the ethylene of the original gas, will contain little or no propylene. Such escaping gas may be fed to another similar reaction vessel and treated in the way described above for the formation of ethylene chlorhydrin.

The solution accumulated in the storage tank may be allowed to flow into the mixing chamber in a continuous stream where it is stirred so as to cause it to dissolve sodium bicarbonate, which may be added from time to time to the mixing vessel. The overflow passes to the chlorination vessel and is then brought into contact with chlorine, so that hypochlorous acid is formed in the solution, and the mixed solution, comprising chlorhydrin, hypochlorous acid and chloride of sodium, is passed to the reaction vessel and brought into contact with the gaseous olefin or olefins necessary to form more chlorhydrin or chlorhydrins of the kind or kinds in the solution.

The chlorhydrin solution is circulated and treated in the above described manner as often as may be necessary until a solution of the desired strength of chlorhydrin is obtained. I have discovered that the efficiency of the process decreases notably after the concentration in the solution has reached 4.5%. This decreased efficiency may be due to slow hydrolysis of the chlorhydrin, to direct action of chlorine thereon in the chlorination chamber, or to oxidation of the chlorhydrin by free hypochlorous acid. Whether or not these are the true explanations, the fact remains that any increase in concentration of the chlorhydrin above 4.5% should be avoided if the process is to be carried out in the most economical manner. On the other hand, it may sometimes be desirable to carry the concentration of the chlorhydrin further, and the process has been carried out to produce a 7% concentration without too great a sacrifice of efficiency.

I have discovered that the best results are obtained by keeping the temperature of the solution on its way to the reaction vessel at about 15° C. While higher temperatures are permissible, I find that the efficiency of the process as regards chlorine and alkali salts is lessened very much at temperatures higher than this.

When the desired concentration of chlorhydrin has been obtained, the solution is run from the storage tank to a suitable distilling apparatus, and distilled to recover the chlorhydrins.

In practice it is advisable to stop at the point just before the sodium bicarbonate has been consumed quantitatively, and acidify the chlorhydrin solution slightly before it is distilled, because chlorhydrin will be partly decomposed by any excess of sodium bicarbonate at the temperature prevailing during distillation.

As examples of the process the following may be noted.

775 gals. or about 7000 lbs. of solution containing 50 lbs. of sodium bicarbonate at the start was run rapidly through the chlorinating apparatus, thence into the reaction vessel, back to the storage tank and again through the apparatus, and so on.

When passing through the chlorinating apparatus, chlorine was added at the rate of about 31 lbs. per hour. This continuous circulation was kept up for 22 hours. During the first 15 hours 50 lbs. of sodium bicarbonate were added per hour in the mixing chamber. By the rapid circulation of the solution through the chlorinating apparatus, the concentration of the hypochlorous acid was kept slightly below 0.15%. The gage pressure maintained in the reaction chamber was about 80 lbs. The oil gas employed contained 19.5% propylene and 16.9% ethylene. The total gas consumption was 4,760 cubic feet. The total chlorine consumption was 681 lbs. The total amount of bicarbonate of soda employed was 750 lbs. The exit gases analyzed, 7% ethylene, 3% propylene and 12% carbon dioxide. The remainder probably comprised gases of the paraffine series.

The final concentration of the chlorhydrin in the solution was 7.0%. The total amount of chlorhydrin produced was about 490 lbs.

In another operation, where the process was discontinued as soon as the final concentration of chlorhydrin was 4%, the amount of chlorine used was 267 lbs. and the amount of chlorhydrin obtained was 264 lbs. In still another run where the process was stopped at a 4% concentration of the chlorhydrin, the amount of chlorine used was 425 lbs. and the chlorhydrin obtained was about 382 lbs.

In the process described sodium bicarbonate is given as the example of an alkali salt of a weak acid. It is to be understood, however, that other such salts may be employed. Indeed, somewhat more efficient results are obtained by employing borax in place of sodium bicarbonate, or by the addition of boric acid to the sodium bicarbonate, but owing to the expense of such borax or boric acid, it is necessary to recover these materials, and this involves a further operation, the cost of which tends to offset the savings due to the use of borax or boric acid.

When boric acid is added to the reaction mixture of sodium bicarbonate, it is added to the saturation concentration for the temperature employed, namely, about 3% by weight.

Further, instead of an alkali salt of a weak acid, I may use certain basic salts capable of neutralizing hydrochloric acid, particularly such basic salts as magnesium oxychloride, which may be obtained by heating $Mg.Cl_2.6H_2O$ or by mixing magnesium chloride and magnesium oxide or hydroxide. These function very much in the same manner as sodium bicarbonate, that is to say when chlorine is passed into an aqueous solution of such a salt or such a mixture, free HOCl is formed and the solution is practically free from chlorine and HCl.

Again, I may use salts of hypochlorous acid which yield free HOCl by hydrolysis; for example, magnesium hypochlorite, calcium hypochlorite or aluminum hypochlorite.

What I claim is:

1. The process of making chlorhydrins of unsaturated hydrocarbons which consists in subjecting such hydrocarbons under pressure greater than atmospheric to the action of an aqueous solution containing not more than 0.15 per cent of hypochlorous acid.

2. The process of making chlorhydrins of unsaturated hydrocarbons which consists in subjecting such hydrocarbons under pressure greater than atmospheric to the action of an aqueous solution containing not more than 0.15 per cent of hypochlorous acid, and maintaining the supply of hypochlorous acid and of such hydrocarbon to the zone of reaction.

3. The process of making chlorhydrins of the olefines which consists in contacting an olefine in gaseous state with a weak aqueous solution containing hypochorous acid, maintaining a pressure greater than atmospheric and a temperature of about 15° C. in the reaction zone, removing the resultant solution and forming more hypochlorous acid in it, contacting the olefinic gas with this solution to form more chlorhydrin, removing the solution containing chlorhydrin when the concentration of the chlorhydrin is less than 7%, and recovering the chlorhydrin therefrom.

4. The process of making chlorhydrins of the olefines, which consists in alternately charging a solution with hypochlorous acid and removing the hypochlorous acid by contacting an olefine with it, whereby chlorhydrins are formed in the solution, repeating the alternation of steps to form more chlorhydrins in the solution, and removing the chlorhydrins from the solution before the concentration of chlorhydrins therein exceeds 7%.

5. The process of making chlorhydrins of the olefines, which consists in alternately charging a solution with hypochlorous acid and removing the hypochlorous acid by contacting an olefine with it, whereby chlorhydrins are formed in the solution, repeating the alternation of steps to form more chlorhydrins in the solution, and removing the chlorhydrins from the solution when the concentration of the chlorhydrins is about 4.5%.

6. The process of making chlorhydrin of unsaturated hydrocarbons, which consists in subjecting such hydrocarbons to the action of an aqueous solution containing not more than 0.15 per cent of hypochlorous acid.

In testimony whereof, I have hereunto set my hand.

BENJAMIN T. BROOKS.